(12) United States Patent  
Gowaikar et al.

(10) Patent No.: US 11,899,099 B2
(45) Date of Patent: Feb. 13, 2024

(54) EARLY FUSION OF CAMERA AND RADAR FRAMES

(71) Applicant: QUALCOMM Incorporated, San Diego, CA (US)

(72) Inventors: Radhika Dilip Gowaikar, San Diego, CA (US); Ravi Teja Sukhavasi, La Jolla, CA (US); Daniel Hendricus Franciscus Fontijne, Haarlem (NL); Bence Major, Amsterdam (NL); Amin Ansari, San Diego, CA (US); Teck Yian Lim, Urbana, IL (US); Sundar Subramanian, San Diego, CA (US); Xinzhou Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 16/698,601

(22) Filed: Nov. 27, 2019

(65) Prior Publication Data

US 2020/0175315 A1     Jun. 4, 2020

Related U.S. Application Data

(60) Provisional application No. 62/774,020, filed on Nov. 30, 2018.

(51) Int. Cl.
*G01S 13/931*     (2020.01)
*G01S 7/41*     (2006.01)
(Continued)

(52) U.S. Cl.
CPC ............ *G01S 13/931* (2013.01); *G01S 7/417* (2013.01); *G01S 13/867* (2013.01);
(Continued)

(58) Field of Classification Search
None
See application file for complete search history.

(56) References Cited

U.S. PATENT DOCUMENTS

2013/0148855 A1    6/2013   Yasugi et al.
2017/0307746 A1   10/2017   Rohani et al.
(Continued)

FOREIGN PATENT DOCUMENTS

CN       112721950 A    *    4/2021
CN       116110025 A    *    5/2023
(Continued)

OTHER PUBLICATIONS

English Translation of DE 10 2018 205 879 A1 using Google Patents Translation (Year: 2018).*
(Continued)

*Primary Examiner* — Thomas E Worden
(74) *Attorney, Agent, or Firm* — QUALCOMM Incorporated

(57) ABSTRACT

Disclosed are techniques for fusing camera and radar frames to perform object detection in one or more spatial domains. In an aspect, an on-board computer of a host vehicle receives, from a camera sensor of the host vehicle, a plurality of camera frames, receives, from a radar sensor of the host vehicle, a plurality of radar frames, performs a camera feature extraction process on a first camera frame of the plurality of camera frames to generate a first camera feature map, performs a radar feature extraction process on a first radar frame of the plurality of radar frames to generate a first radar feature map, converts the first camera feature map and/or the first radar feature map to a common spatial domain, and concatenates the first radar feature map and the first camera feature map to generate a first concatenated feature map in the common spatial domain.

28 Claims, 8 Drawing Sheets

(51) Int. Cl.
| | | |
|---|---|---|
| *G01S 13/86* | (2006.01) | |
| *G05D 1/00* | (2006.01) | |
| *G05D 1/02* | (2020.01) | |
| *G06T 7/60* | (2017.01) | |
| *G06V 20/56* | (2022.01) | |
| *G06F 18/25* | (2023.01) | |
| *G06F 18/22* | (2023.01) | |
| *G06F 18/213* | (2023.01) | |
| *G06V 10/80* | (2022.01) | |

(52) U.S. Cl.
CPC ......... *G05D 1/0088* (2013.01); *G05D 1/0231* (2013.01); *G05D 1/0257* (2013.01); *G06F 18/213* (2023.01); *G06F 18/22* (2023.01); *G06F 18/253* (2023.01); *G06T 7/60* (2013.01); *G06V 10/80* (2022.01); *G06V 20/56* (2022.01); *G01S 2013/9318* (2020.01); *G01S 2013/9319* (2020.01); *G01S 2013/9321* (2013.01); *G01S 2013/93185* (2020.01); *G01S 2013/93276* (2020.01); *G05D 2201/0213* (2013.01); *G06T 2207/10044* (2013.01); *G06T 2207/30252* (2013.01)

(56) References Cited

U.S. PATENT DOCUMENTS

| | | | | |
|---|---|---|---|---|
| 2018/0341263 | A1* | 11/2018 | Rust | G01S 13/74 |
| 2019/0122073 | A1* | 4/2019 | Ozdemir | A61B 6/5217 |
| 2021/0158544 | A1* | 5/2021 | Steinmeyer | G01S 13/867 |
| 2022/0357441 | A1* | 11/2022 | Ansari | G01S 7/417 |
| 2023/0230484 | A1* | 7/2023 | Al Faruque | G08G 1/167 |
| | | | | 701/28 |

FOREIGN PATENT DOCUMENTS

| | | | | |
|---|---|---|---|---|
| DE | 102018205879.2 A | * | 4/2018 | ............ G01C 11/00 |
| EP | 1395851 B1 | | 7/2006 | |
| EP | 3358551 A1 | | 8/2018 | |
| KR | 20120044693 A | * | 5/2012 | |
| KR | 20130052405 A | * | 5/2013 | |
| WO | WO-2017165627 A1 | * | 9/2017 | ........... G05D 1/0246 |
| WO | 2018154367 A1 | | 8/2018 | |

OTHER PUBLICATIONS

"SegNet: A Deep Convolutional Encoder-Decoder Architecture for Image Segmentation"; Vijay Badrinarayanan, Alex Kendall , and Roberto Cipolla; IEEE Transactions on Pattern Analysis and Machine Intelligence, vol. 39, No. 12, Dec. 2017; pp. 2481-2495 (Year: 2017).*

"A Folded Neural Network Autoencoder for Dimensionality Reduction"; Jing Wanga, Haibo Hea, Danil V. Prokhorovb; Proceedings of the International Neural Network Society Winter Conference (INNS-WC 2012); Procedia Computer Science 13; 2012; pp. 120-127 (Year: 2012).*

English translation for CN 116110025 A (Year: 2023).*
English translation for CN 112721950 A (Year: 2021).*
English translation for KR 20130052405 A (Year: 2013).*
English translation for KR 20120044693 A (Year: 2012).*
International Search Report and Written Opinion—PCT/US2019/063856—ISAEPO—dated Jun. 25, 2020.
Partial International Search Report—PCT/US2019/063856—ISA/EPO—dated Feb. 17, 2020.

* cited by examiner

EARLY FUSION OF CAMERA AND RADAR FRAMES

CROSS-REFERENCE TO RELATED APPLICATIONS

The present application for patent claims the benefit of U.S. Provisional Application No. 62/774,020, entitled "EARLY FUSION OF CAMERA AND RADAR FRAMES," filed Nov. 30, 2018, assigned to the assignee hereof, and expressly incorporated herein by reference in its entirety.

INTRODUCTION

1. Field of the Disclosure

Aspects of this disclosure relate generally to early fusion of camera and radar frames.

2. Background

Radar and camera sensors are often employed on vehicles to enable systems for enhanced vehicle safety, such as adaptive cruise control (ACC), forward collision warning (FCW), collision mitigation or avoidance via autonomous braking, pre-crash functions such as airbag arming or pre-activation, and lane departure warning (LDW). Systems that employ both radar and camera sensors can provide a high level of active safety capability and are increasingly available on production vehicles.

One or more camera sensors mounted on a vehicle capture images of the scene in front of the vehicle, and possibly behind and to the sides of the vehicle. A digital signal processor (DSP) within the vehicle then attempts to identify objects within the captured images. Such objects may be other vehicles, pedestrians, road signs, objects within the road of travel, etc. Radar systems may also be used to detect objects along the road of travel. Radar systems utilize radio waves to determine the range, altitude, direction, and/or speed of the objects along the road. A transmitter transmits pulses of radio waves that bounce off of objects in their path. The pulses reflected from the objects return a small part of the radio wave's energy to a receiver, which is typically located at the same location as the transmitter.

The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

Radar-vision fusion methods differ mainly at the fusion level. Early fusion combines several sources of raw data to produce an output that is expected to be more directly informative than either of the inputs in isolation. In early fusion, various features, such as edges, corners, lines, texture parameters, etc., are combined into a feature map that is then used by further processing stages. In high level fusion, each source of input yields a decision and the decisions are fused.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of fusing camera and radar frames to perform object detection in one or more spatial domains performed by an on-board computer of a host vehicle includes receiving, from a camera sensor of the host vehicle, a plurality of camera frames; receiving, from a radar sensor of the host vehicle, a plurality of radar frames; performing a camera feature extraction process on a first camera frame of the plurality of camera frames to generate a first camera feature map; performing a radar feature extraction process on a first radar frame of the plurality of radar frames to generate a first radar feature map; converting the first camera feature map and/or the first radar feature map to a common spatial domain; concatenating the first radar feature map and the first camera feature map to generate a first concatenated feature map in the common spatial domain; and detecting one or more objects in the first concatenated feature map.

In an aspect, a method of fusing camera and radar frames to perform object detection in one or more spatial domains performed by an on-board computer of a host vehicle includes receiving, from a camera sensor of the host vehicle, a plurality of camera frames; receiving, from a radar sensor of the host vehicle, a plurality of radar frames; applying an encoder-decoder network on the first camera frame to generate a first camera feature map in a spatial domain of the first radar frame; combining the first radar frame and the first camera feature map to generate a first combined feature map in the spatial domain of the first radar frame; and detecting one or more objects in the first combined feature map.

In an aspect, an on-board computer of a host vehicle includes at least one processor configured to: receive, from a camera sensor of the host vehicle, a plurality of camera frames; receive, from a radar sensor of the host vehicle, a plurality of radar frames; perform a camera feature extraction process on a first camera frame of the plurality of camera frames to generate a first camera feature map; perform a radar feature extraction process on a first radar frame of the plurality of radar frames to generate a first radar feature map; convert the first camera feature map and/or the first radar feature map to a common spatial domain; concatenate the first radar feature map and the first camera feature map to generate a first concatenated feature map in the common spatial domain; and detect one or more objects in the first concatenated feature map.

In an aspect, an on-board computer of a host vehicle includes at least one processor configured to: receive, from a camera sensor of the host vehicle, a plurality of camera frames; receive, from a radar sensor of the host vehicle, a plurality of radar frames; apply an encoder-decoder network on the first camera frame to generate a first camera feature map in a spatial domain of the first radar frame; combine the first radar frame and the first camera feature map to generate a first combined feature map in the spatial domain of the first radar frame; and detect one or more objects in the first combined feature map.

In an aspect, an on-board computer of a host vehicle includes means for receiving, from a camera sensor of the host vehicle, a plurality of camera frames; means for receiving, from a radar sensor of the host vehicle, a plurality of radar frames; means for performing a camera feature extraction process on a first camera frame of the plurality of camera frames to generate a first camera feature map; means for performing a radar feature extraction process on a first radar frame of the plurality of radar frames to generate a first radar feature map; means for converting the first camera feature map and/or the first radar feature map to a common spatial domain; means for concatenating the first radar feature map and the first camera feature map to generate a first concatenated feature map in the common spatial domain; and means for detecting one or more objects in the first concatenated feature map.

In an aspect, an on-board computer of a host vehicle includes means for receiving, from a camera sensor of the host vehicle, a plurality of camera frames; means for receiving, from a radar sensor of the host vehicle, a plurality of radar frames; means for applying an encoder-decoder network on the first camera frame to generate a first camera feature map in a spatial domain of the first radar frame; means for combining the first radar frame and the first camera feature map to generate a first combined feature map in the spatial domain of the first radar frame; and means for detecting one or more objects in the first combined feature map.

In an aspect, a non-transitory computer-readable medium storing computer-executable instructions includes computer-executable instructions comprising at least one instruction instructing an on-board computer of a host vehicle to receive, from a camera sensor of the host vehicle, a plurality of camera frames; at least one instruction instructing the on-board computer to receive, from a radar sensor of the host vehicle, a plurality of radar frames; at least one instruction instructing the on-board computer to perform a camera feature extraction process on a first camera frame of the plurality of camera frames to generate a first camera feature map; at least one instruction instructing the on-board computer to perform a radar feature extraction process on a first radar frame of the plurality of radar frames to generate a first radar feature map; at least one instruction instructing the on-board computer to convert the first camera feature map and/or the first radar feature map to a common spatial domain; at least one instruction instructing the on-board computer to concatenate the first radar feature map and the first camera feature map to generate a first concatenated feature map in the common spatial domain; and at least one instruction instructing the on-board computer to detect one or more objects in the first concatenated feature map.

In an aspect, a non-transitory computer-readable medium storing computer-executable instructions includes computer-executable instructions comprising at least one instruction instructing an on-board computer of a host vehicle to receive, from a camera sensor of the host vehicle, a plurality of camera frames; at least one instruction instructing the on-board computer to receive, from a radar sensor of the host vehicle, a plurality of radar frames; at least one instruction instructing the on-board computer to apply an encoder-decoder network on the first camera frame to generate a first camera feature map in a spatial domain of the first radar frame; at least one instruction instructing the on-board computer to combine the first radar frame and the first camera feature map to generate a first combined feature map in the spatial domain of the first radar frame; and at least one instruction instructing the on-board computer to detect one or more objects in the first combined feature map.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
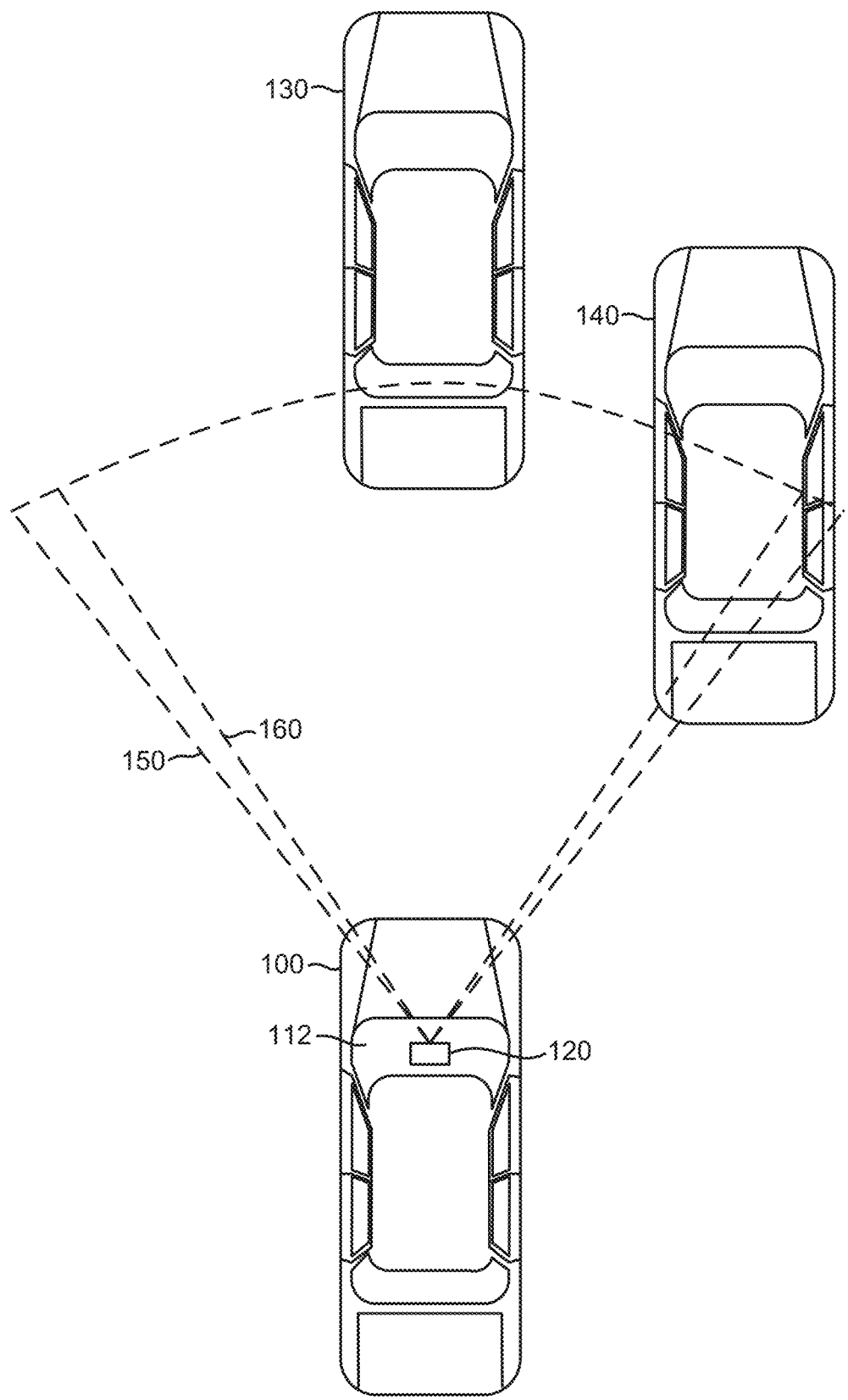
FIG. 1 is a top view of a vehicle employing an integrated radar-camera sensor behind the windshield, according to various aspects.

Referring now to FIG. 1, a vehicle 100 (referred to as an "ego vehicle" or "host vehicle") is illustrated that includes a radar-camera sensor module 120 located in the interior compartment of the vehicle 100 behind the windshield 112. The radar-camera sensor module 120 includes a radar component configured to transmit radar signals through the windshield 112 in a horizontal coverage zone 150 (shown by dashed lines), and receive reflected radar signals that are reflected off of any objects within the coverage zone 150. The radar-camera sensor module 120 further includes a camera component for capturing images based on light waves that are seen and captured through the windshield 112 in a horizontal coverage zone 160 (shown by dashed lines).

Although FIG. 1 illustrates an example in which the radar component and the camera component are collocated components in a shared housing, as will be appreciated, they may be separately housed in different locations within the vehicle 100. For example, the camera may be located as shown in FIG. 1, and the radar component may be located in the grill or front bumper of the vehicle 100. Additionally, although FIG. 1 illustrates the radar-camera sensor module 120 located behind the windshield 112, it may instead be located in a rooftop sensor array, or elsewhere. Further, although FIG. 1 illustrates only a single radar-camera sensor module 120, as will be appreciated, the vehicle 100 may have multiple radar-camera sensor modules 120 pointed in different directions (to the sides, the front, the rear, etc.). The various radar-camera sensor modules 120 may be under the "skin" of the vehicle (e.g., behind the windshield 112, door panels, bumpers, grills, etc.) or within a rooftop sensor array.

The radar-camera sensor module 120 may detect one or more (or none) objects relative to the vehicle 100. In the example of FIG. 1, there are two objects, vehicles 130 and 140, within the horizontal coverage zones 150 and 160 that the radar-camera sensor module 120 can detect. The radar-camera sensor module 120 may estimate parameters of the detected object(s), such as the position, range, direction, speed, size, classification (e.g., vehicle, pedestrian, road sign, etc.), and the like. The radar-camera sensor module 120 may be employed onboard the vehicle 100 for automotive safety applications, such as adaptive cruise control (ACC), forward collision warning (FCW), collision mitigation or avoidance via autonomous braking, lane departure warning (LDW), and the like.

Collocating the camera and radar permits these components to share electronics and signal processing, and in particular, enables early radar-camera data fusion. For example, the radar and camera may be integrated onto a single board. A joint radar-camera alignment technique may be employed to align both the radar and the camera. However, collocation of the radar and camera is not required to practice the techniques described herein.

Figure 2:
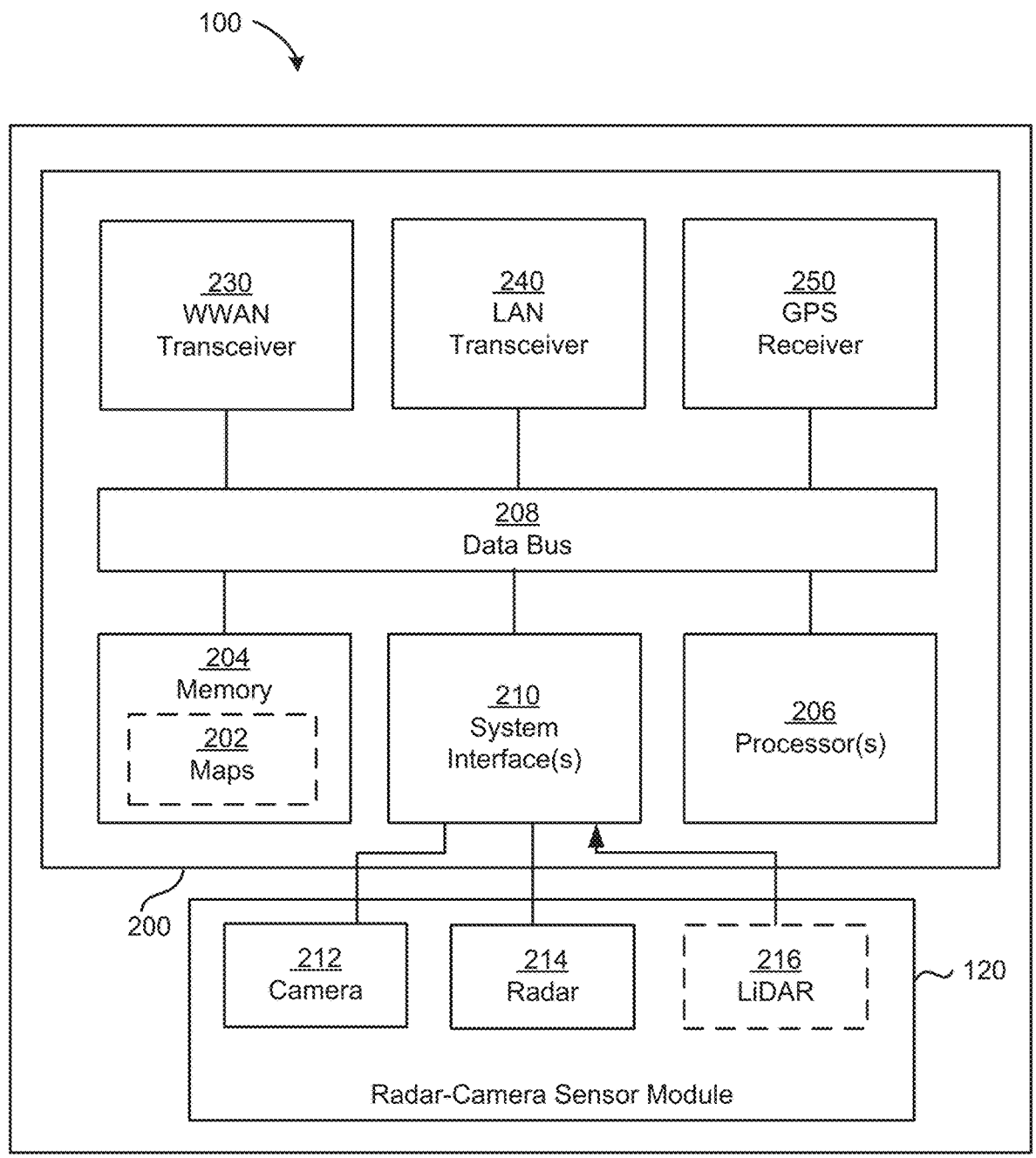
FIG. 2 illustrates an on-board computer architecture, according to various aspects.

FIG. 2 illustrates an on-board computer (OBC) 200 of a vehicle 100, according to various aspects of the disclosure. In an aspect, the OBC 200 may be part of an ADAS or ADS. The OBC 200 includes a non-transitory computer-readable storage medium, i.e., memory 204, and one or more processors 206 in communication with the memory 204 via a data bus 208. The memory 204 includes one or more storage modules storing computer-readable instructions executable by the processor(s) 206 to perform the functions of the OBC 200 described herein. For example, the processor(s) 206 in conjunction with the memory 204 may implement the various neural network architectures described herein.

One or more radar-camera sensor modules 120 are coupled to the OBC 200 (only one is shown in FIG. 2 for simplicity). In some aspects, the radar-camera sensor module 120 includes at least one camera 212, at least one radar 214, and an optional light detection and ranging (LiDAR) sensor 216. The OBC 200 also includes one or more system interfaces 220 connecting the processor(s) 206, by way of the data bus 208, to the radar-camera sensor module 120 and, optionally, other vehicle sub-systems (not shown).

The OBC 200 also includes, at least in some cases, a wireless wide area network (WWAN) transceiver 230 configured to communicate via one or more wireless communication networks (not shown), such as an NR network, an LTE network, a GSM network, and/or the like. The WWAN transceiver 230 may be connected to one or more antennas (not shown) for communicating with other network nodes, such as other vehicle UEs, pedestrian UEs, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceiver 230 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 200 also includes, at least in some cases, a wireless local area network (WLAN) transceiver 240. The WLAN transceiver 240 may be connected to one or more antennas (not shown) for communicating with other network nodes, such as other vehicle UEs, pedestrian UEs, infrastructure access points, RSUs, etc., via at least one designated RAT (e.g., cellular vehicle-to-everything (C-V2X), IEEE 802.11p (also known as wireless access for vehicular environments (WAVE)), dedicated short-range communication (DSRC), etc.) over a wireless communication medium of interest. The WLAN transceiver 240 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The OBC 200 also includes, at least in some cases, a global positioning systems (GPS) receiver 250. The GPS receiver 250 may be connected to one or more antennas (not shown) for receiving satellite signals. The GPS receiver 250 may comprise any suitable hardware and/or software for receiving and processing GPS signals. The GPS receiver 250 requests information and operations as appropriate from the other systems, and performs the calculations necessary to determine the vehicle's 100 position using measurements obtained by any suitable GPS algorithm.

In an aspect, the OBC 200 may utilize the WWAN transceiver 230 and/or the WLAN transceiver 240 to download one or more maps 202 that can then be stored in memory 204 and used for vehicle navigation. Map(s) 202 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 100. Map(s) 202 may also provide electronic horizon predictive awareness, which enables the vehicle 100 to know what lies ahead.

In an aspect, the camera 212 may capture image frames (also referred to herein as camera frames) of the scene within the viewing area of the camera 212 (as illustrated in FIG. 1 as horizontal coverage zone 160) at some periodic rate. Likewise, the radar 214 may capture radar frames of the scene within the viewing area of the radar 214 (as illustrated in FIG. 1 as horizontal coverage zone 150) at some periodic rate. The periodic rates at which the camera 212 and the radar 214 capture their respective frames may be the same or different. Each camera and radar frame may be time-stamped. Thus, where the periodic rates are different, the timestamps can be used to select simultaneously, or nearly simultaneously, captured camera and radar frames for further processing (e.g., fusion).

Figure 3:
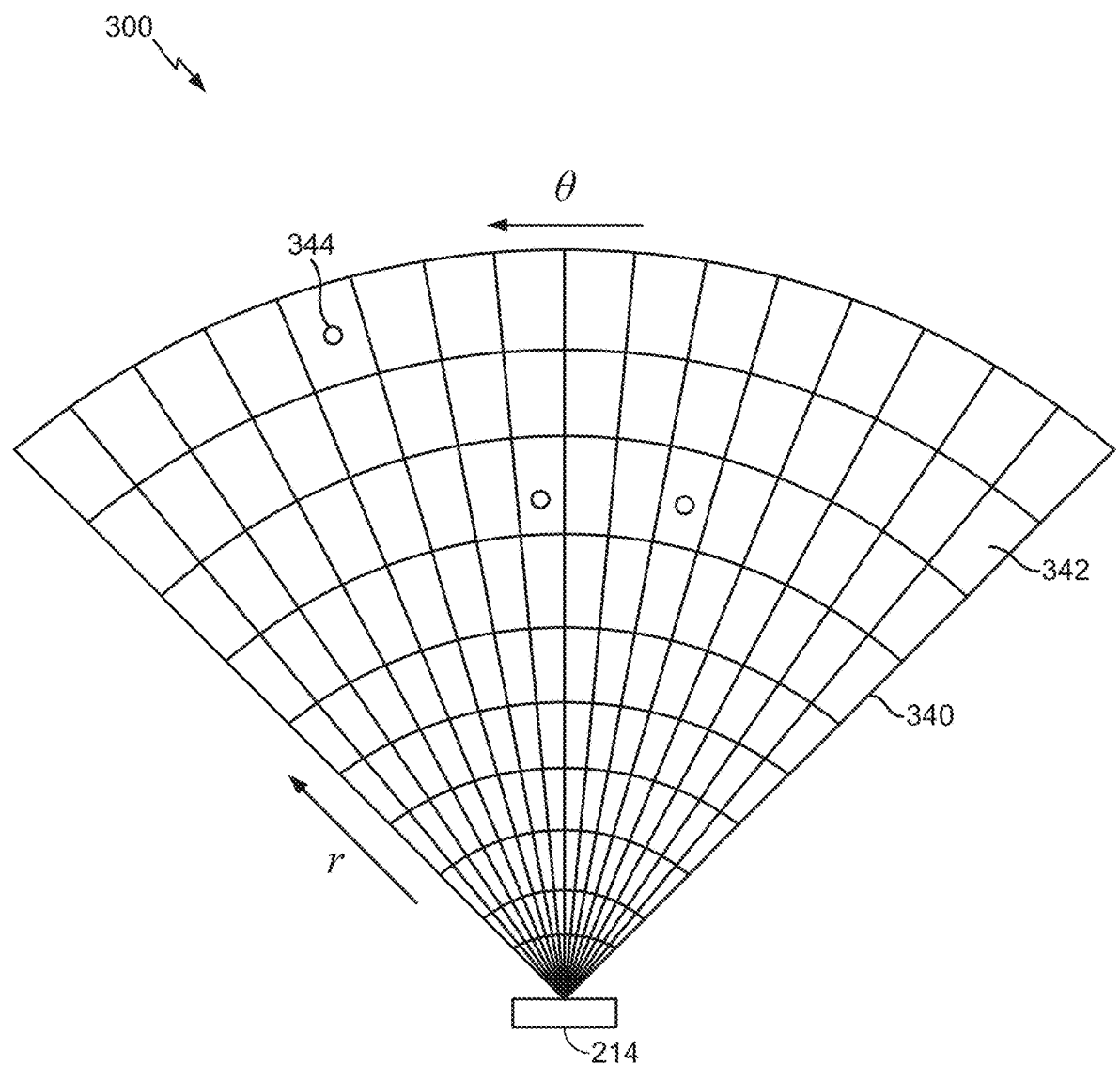
FIG. 3 is a schematic of a sensed observation radar grid.

FIG. 3 illustrates a sensed observation radar grid 300. A transmitter (e.g., an array of transmit antennas) of the radar 214 transmits pulses of electromagnetic RF waves that reflect from object(s) in the transmission path, such as vehicles 130 and 140 in FIG. 1. A portion of the electromagnetic RF waves that are reflected from the object(s) are returned to the receiver (e.g., an array of receive antennas) of the radar 214, which is usually located at the same site as the transmitter of the radar 214.

In an aspect, the radar 214 may be an imaging radar that uses beamforming to scan horizontally and vertically. Beamforming is a technique used to aim the effective direction of a radar beam by changing the delay between different transmitting antennas so that the signals add constructively in a specified direction. Thus, the radar 214 may scan horizontally and vertically across the sensing area (e.g., horizontal coverage zone 150) by using a transmitter comprising an array of electronically steered antennas.

The returned response measured by the radar 214 is characterized as an observation grid 340 having a plurality of observation cells 342. Each cell 342 represents the measured returned response value at a specific range (r) and angle/azimuth (θ). Each cell 342 is alternately referred to as a range-angle bin. Features 344 are extracted from the cells 342 to determine whether the feature 344 is an object (e.g., a vehicle 130/140). Each feature 344 within a respective cell 342 can be identified as having up to four parameters: range, Doppler, azimuth, and elevation. This is called a radar frame. As an example, a feature 344 within a cell 342 may be the signal-to-noise ratio (SNR) computed by a constant false alarm rate (CFAR) algorithm. However, it should be understood that other methods may be used to target and identify features 344 within a cell 342.

In contrast to images (e.g., from camera 212), radar signals (e.g., from radar 214) have several unique characteristics. One is specular reflections, in which only certain surfaces on the target having an advantageous orientation reflect the radar signal, which often results in a small number of reflections. A second is non-uniformity, in which objects that appear at the far range of the {range, azimuth} signal space are always smaller and have a different shape than those that appear at closer ranges. This is not the case with camera images.

Figure 4:
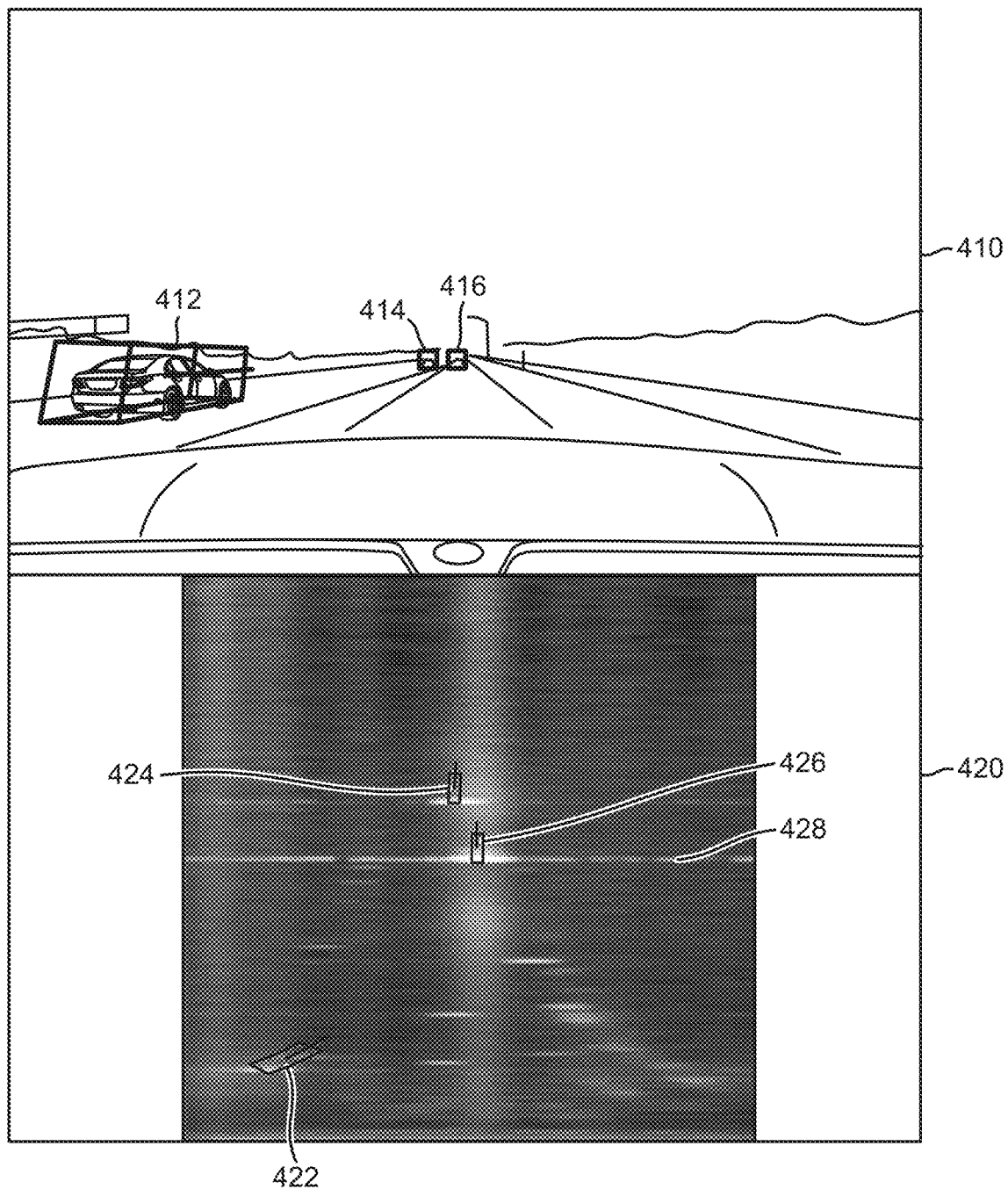
FIG. 4 illustrates exemplary differences between a camera image and a radar image of the same scene.

FIG. 4 illustrates exemplary differences between a camera image 410 and a radar image 420 of the same scene. A radar image (e.g., radar image 420), which may also be referred to as a radar frame, may be a visual representation of a sensed occupancy radar grid (e.g., sensed occupancy radar grid 300). A radar image is a range-azimuth matrix/tensor (where the radar image is a two-dimensional radar image) or a range-azimuth-Doppler matrix/tensor (where the radar image is a three-dimensional radar image). The matrix/tensor represents the received power of the returned radar signals as the values along each of these axes. For example, a range-azimuth radar frame, such as radar image 420, will have one power value (e.g., in dB) per range-azimuth bin. Generally, different power values are represented as different colors and/or shades, as shown in radar image 420.

With reference to FIG. 4, the camera image 410 may have been captured by the camera 212, and the radar image 420 may have been captured by the radar 214. In the camera image 410, three objects (here, vehicles) have been detected, each surrounded by a bounding box 412, 414, and 416. In the radar image 420, the same three objects (vehicles) have been detected and are surrounded by bounding boxes 422, 424, and 426. As can be seen in FIG. 4, the shapes of the objects/bounding boxes 422, 424, and 426 in the radar image 420 are different sizes and shapes based on whether or not they are below (i.e., bounding box 422) or above (i.e., bounding boxes 424 and 426) the midline 428 of the radar image 420. In addition, the bounding boxes associated with the closer object (i.e., bounding box 422) are larger than the bounding boxes associated with farther objects (i.e., bounding boxes 424 and 426) due to reception at the radar 214 of fewer reflected radio waves due to the greater distance between the radar 214 and the further objects.

Figure 5:
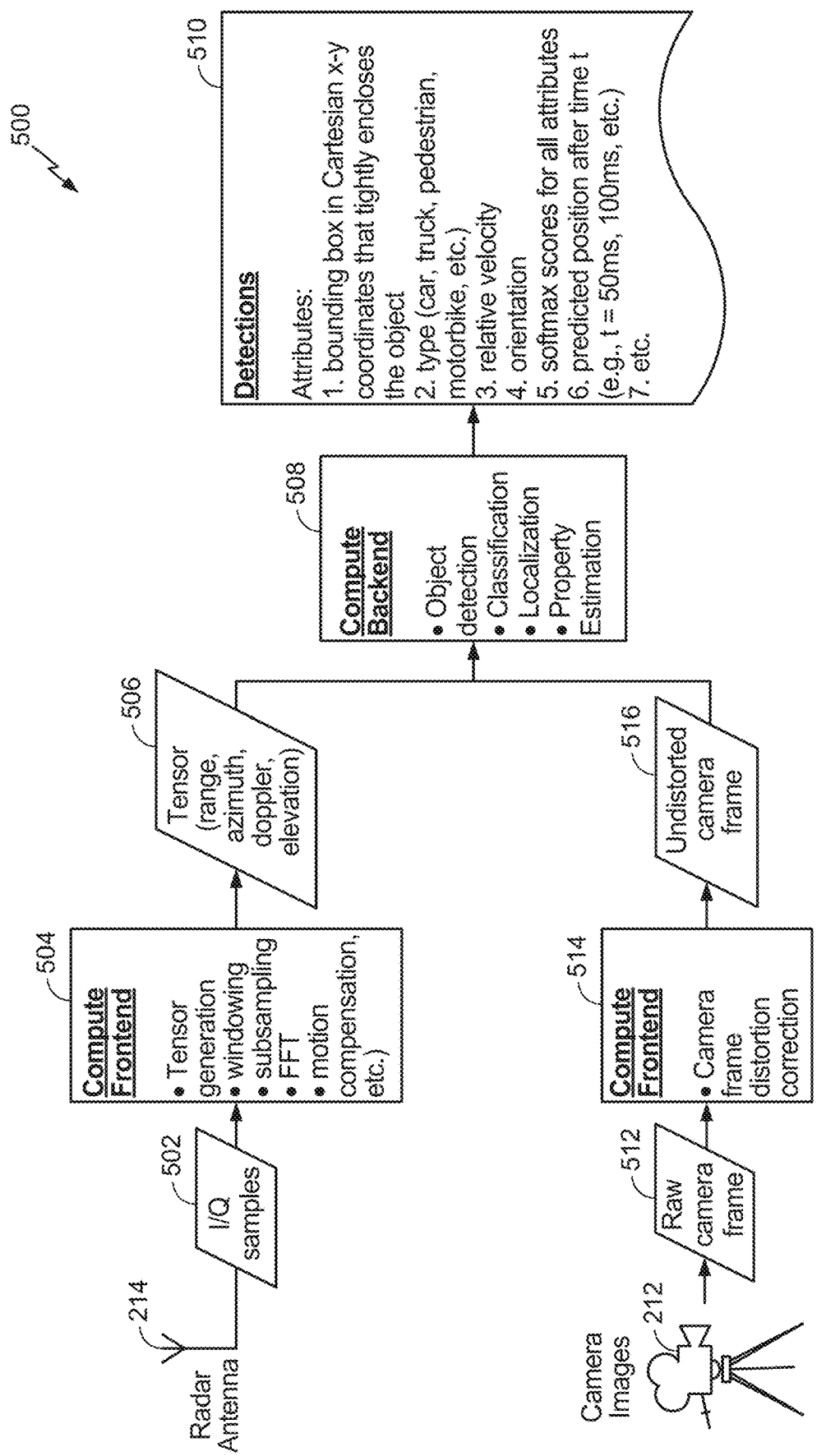
FIG. 5 is a block diagram showing how a radar-camera sensor module and/or one or more processors process data from a camera sensor and a radar sensor, according to various aspects.

FIG. 5 is a block diagram 500 showing how the radar-camera sensor module 120 and/or the processor(s) 206 process data from the camera 212 and the radar sensor 214, according to various aspects of the disclosure. As noted above, the radar sensor 214 may capture radar frames of the scene within the viewing area of the radar sensor 214 (as illustrated in FIG. 1 as horizontal coverage zone 150). Time-domain (e.g., I/Q) samples 502 are generated from the captured radar frames. The time-domain samples 502 are the raw data that is processed to generate the tensors that will be used during the backend processing.

More specifically, a compute frontend 504 performs tensor generation, windowing, subsampling, fast Fourier transform (FFT), motion compensation, and the like to generate four dimensional (4D) tensors 506 for features 344 within cells 342 of occupancy grid 340 detected by the radar sensor 214. In an aspect, the radar sensor 214 is an imaging radar sensor that scans horizontally and vertically. As such, the tensors 506 represent the range (distance from the radar 214 to a detected feature 344), azimuth (the horizontal distance between a feature 344 and a reference RF ray emitted by the radar 214, such as the initial RF ray of a radar sweep), Doppler (indicating the speed of a detected feature 344), and elevation (vertical direction from the radar 214 to a detected feature) of each detected feature 344. These tensors are then passed to a compute backend 508 that performs object detection, object classification, localization, and property estimation based on the tensors 506 and undistorted camera frames 516 received from the compute frontend 514 for the camera 212.

On the camera 212 side, the camera 212, simultaneously (or nearly simultaneously) with the radar 214 capturing radar frames of the same scene, captures raw camera frames 512 of the scene within the viewing area of the camera 212 (as illustrated in FIG. 1 as horizontal coverage zone 160). A compute frontend 514 for the camera 212 corrects any distortion in the raw camera frames 512 to generate undistorted camera frames 516. The undistorted camera frames 516 are passed to the compute backend 508 for processing with the tensors 506.

The results 510 of the processing performed by the compute backend 508 are various attributes of the detected object(s), such as a bounding box in Cartesian x-y coordinates that tightly encloses the object(s), the type of the object(s) (e.g., car, truck, pedestrian, motorcycle, road sign, etc.) relative (e.g., to the vehicle 100) velocity, orientation, softmax function scores (a probability of a given output of a tensor in binary classification) for all attributes, predicted position(s) of the object(s) after some amount of time (e.g., 50 ms, 100 ms, etc.), and the like.

Referring to the compute frontend 504 in greater detail, the compute frontend 504 receives as input I/Q samples 502 organized as radar frames, where each frame may be represented as a three-dimensional (3D) tensor representing the virtual receive antenna index (which indicates the MIMO operation in order to virtually construct, for example, 31 antennas out of 2 transmit (Tx) and 16 receive (Rx) antennas), chirp index, and sample index of the corresponding radar signals. The compute frontend 504 may output a 4D complex-valued tensor representing range, azimuth, Doppler, and elevation. Optionally, the compute frontend 504 may sub-select, group, compress, "argmax" (the points of the domain of some function at which the function values are maximized), or "any-function-of" one or more of these dimensions. Alternatively, the compute frontend 504 may output a 3D complex-valued tensor representing range, azimuth, and Doppler. As yet another alternative, the compute frontend 504 may output a set of two-dimensional (2D) complex-valued tensors representing one or more of range and azimuth, range and Doppler, Doppler and azimuth, range and elevation, Doppler and elevation, or azimuth and elevation. Salient information is sometimes contained in the frequency content of the radar signal, in which case, further signal processing to extract this frequency information can be performed.

Referring to the compute backend 508 in greater detail, the compute backend 508 may implement various "deep learning" techniques (machine learning methods based on learning data representations, as opposed to task-specific algorithms) to determine the results 510. Deep neural networks (DNNs) (a type of deep learning, comprising an artificial neural network (ANN) with multiple layers between the input and output layers) may be used to detect, classify, locate and understand objects from radar signals and camera images.

Disclosed herein are techniques for early fusion of camera frames (e.g., undistorted camera frames 516) and radar frames to perform object detection in the bird's eye view (the viewpoint of the radar 214). The "bird's eye view" that the radar 214 captures is a top view, or aerial view, of the environment in the direction that the radar 214 is emitting pulses of radio waves (as illustrated in FIG. 1). In contrast, the camera 212 captures an image of the same environment that is substantially orthogonal to the radar's 214 view of the environment. Because these two views are orthogonal to each other, radar frames and camera frames of the same scene need to be brought into the same plane (i.e., fused) in order for existing object detection techniques to be applicable.

Fusion can be performed at different levels of processing. Early fusion combines several sources of raw data, such as data from the camera 212 (e.g., raw camera frames 512), the radar 214 (e.g., I/Q samples 502), and/or the LiDAR sensor 216, to produce new output that is expected to be more directly informative than the inputs in isolation. In early fusion, various features, such as edges, corners, lines, texture parameters, etc., are combined into a feature map that is then used by further processing stages. In contrast, in high level fusion, each source of input (e.g., the camera 212, the radar 214, and/or the LiDAR sensor 216) yields a decision (e.g., an object detection and/or classification) and the decisions are fused. The higher the level at which fusion is performed, the lower the subsequent computation cost (due to the condensed nature of the information). However, the accuracy may be lower. In contrast, the lower the level at which fusion is performed, the higher the subsequent computational cost. However, the accuracy can be much higher. As such, it would be beneficial to be able to fuse information from different sources at an early stage while reducing computation costs.

In an aspect, to perform early fusion, selected camera frames and the corresponding radar frames are passed through respective feature extraction branches, and the features from both branches are concatenated to permit subsequent detection of objects in the combined frame. As noted above, due to the differing periodic rates at which the camera 212 and the radar 214 capture their respective frames, the timestamps of the frames may not match. In order to match a camera frame to a radar frame, a camera frame (which may be captured at the slower of the periodic rates) is selected and the closest timestamped radar frame (which may be captured at the faster periodic rate) is selected as the corresponding frame. The camera frame is then passed through a feature extraction branch having multiple convolutional layers (an integral that expresses the amount of overlap of one function as it is shifted over another function; it therefore "blends" one function with another) to generate a latent feature map representing the camera image. The latent feature map (i.e., the feature map after going through multiple convolutional layers) of the camera frame is converted to the same space as the radar frame (i.e., the bird's eye view) by performing an explicit inverse perspective mapping transformation.

Alternatively, another way to create an abstract camera image representation in the coordinate space of the radar frame is to first transform the camera image to the same space as the radar image (i.e., the bird's eye view), and then run this result through multiple convolutional layers to generate the latent feature map of the camera frame. Whichever way the camera frame is converted to the radar space, the corresponding radar frame is run through a feature extraction branch of its own (with multiple convolutional layers) to generate a latent feature map representing the radar frame. The features from both branches are concatenated, and the new tensor (representing the concatenated frame) is run through a set of new convolutional layers before running the resulting representation through an object detection algorithm module (e.g., single shot detection (SSD)) to arrive at the final object detections. The process then repeats for the next pair of camera and radar frames.

In an alternative aspect, rather than match the camera frame to a radar frame, the radar frame can be brought into the camera frame, or the two frames can be converged somewhere in the middle. For example, both frames can be tilted towards each other first, and then the result can be tilted back to the bird's eye view.

SSD is a method for detecting objects in images using a single deep neural network. An SSD discretizes the output space of bounding boxes into a set of default boxes (also referred to as "prior boxes" or "anchor boxes") over different aspect ratios and scales per feature map location. At prediction time, the network generates scores for the presence of each object category in each default box and produces adjustments to the box to better match the object shape. Additionally, the network combines predictions from multiple feature maps with different resolutions to naturally handle objects of various sizes. An SSD head indicates the detection and regression heads from the SSD networks. The SSD model eliminates proposal generation and subsequent pixel or feature resampling stages and encapsulates all computation in a single network. This makes SSD easy to train and straightforward to integrate into systems that require a detection component.

As noted above, the above fusion technique is performed for each frame (at least for the frames captured at the slower periodic rate). As such, it would be beneficial to reduce the per frame computation of radar-based or vision-based object detection networks. This can be accomplished by using block hashing. For example, in autonomous driving applications, a large portion of the frame (either camera or radar) does not change (absolutely or relatively) from one frame to another. For example, a portion of each frame may capture the dashboard, the sky, the road, etc., and these regions may not change noticeably, or at all, from frame to frame. As such, processing each entire frame in a series of frames may be unnecessarily redundant.

Based on this observation, the radar-camera sensor module 120 can either perform an exact or perceptual hash on blocks of each input frame to identify which blocks have not changed from the previous frame to the current frame. For example, each frame could be divided into an 8×8 grid having 64 blocks. Next, the radar-camera sensor module 120 can use this information to simply copy the feature map values from the previous frame's computation to the current frame, instead of recalculating the same (or almost the same) values. This information can be further propagated through the neural network to prevent the network from performing redundant computations in the later layers of the network (i.e., cone propagation through feature maps).

In an aspect, pre-trained camera-based object detection networks can be used to enable bird's eye view object detection and localization in a radar frame. For example, pre-trained object detection networks for camera images, such as ResNeXt (a modularized network architecture for image classification) or Inception-Resnet-V2, can be used to perform object detection in the camera frames. The same network can be augmented to estimate the length of an object captured in the camera frame (by augmenting the SSD heads). For example, where the object is a vehicle, the make and model of the vehicle, and also the depth that is perceivable in the camera frame, can be used to estimate the length/depth of the vehicle.

Figure 6:
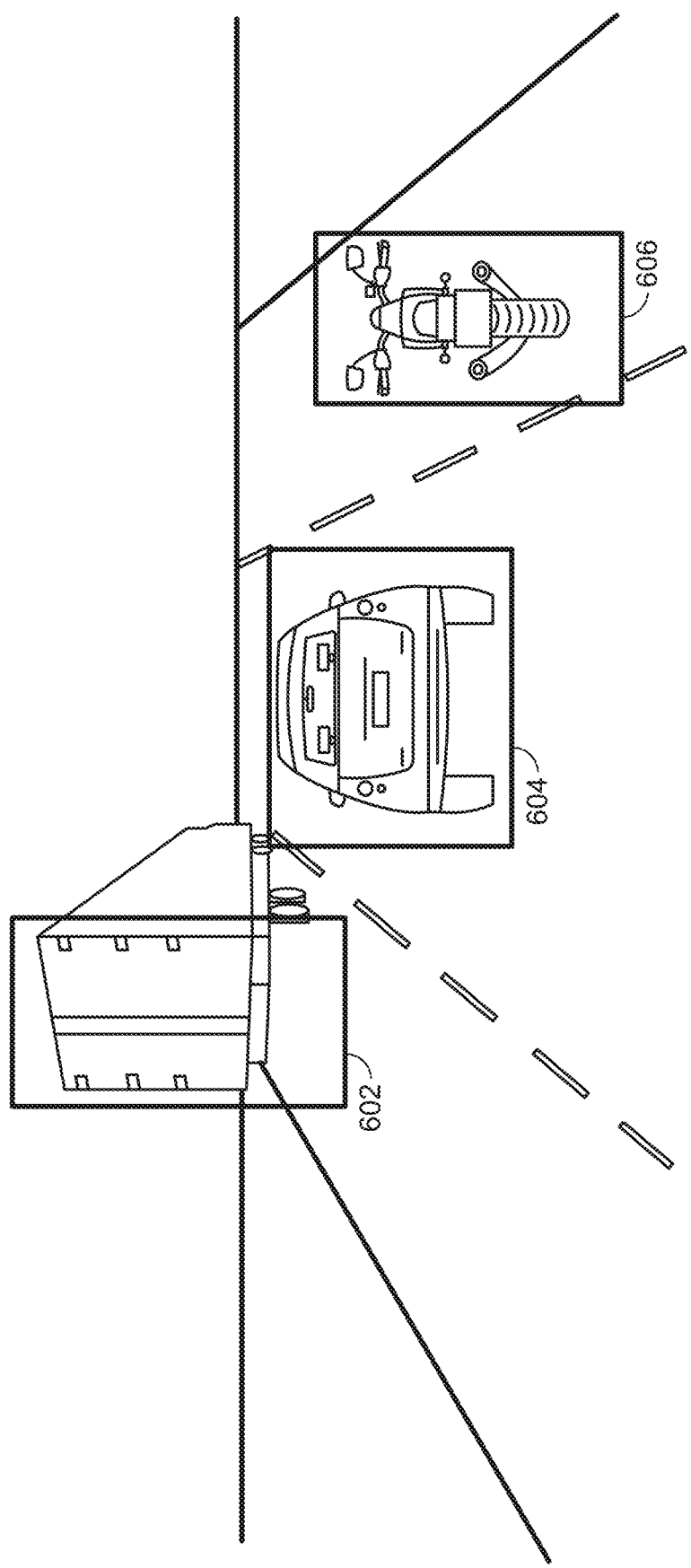
FIG. 6 illustrates an on-road scenario, according to an aspect of the present disclosure.

For purposes of illustration, FIG. 6 shows an exemplary scenario wherein three objects precede the host vehicle (e.g., vehicle 100) on a highway. The illustrated objects are a tractor trailer, a sports-utility vehicle, and a motorcycle, respectively. As shown in FIG. 6, each object is outlined by a bounding box 602, 604, and 606, respectively.

In an aspect, the 2D bounding boxes (e.g., bounding boxes 602, 604, and 606) overlaid on the camera frame can be used to estimate the width of the object in the bird's eye view, after inverse perspective mapping. This can be done through the camera branch using deep learning (through learned features). The estimated length and width of the object can be used to form the complete bounding box in the bird's eye view.

In an aspect, instead of performing an explicit inverse perspective mapping, which is very sensitive to the calibration parameters of the radar 214 and camera 212, newer techniques, such as a bilateral convolutional network, a deformable convolutional network (a convolutional neural network (CNN) in which a 2D offset is added to enable a deformed sampling grid), or a spatial transformation network (a CNN that uses spatial transformers to learn invariance to translation, scale, rotation and more generic warping), can be used at a later stage of the base network.

Given the difficulty of training a fusion network (i.e., the neural network that fuses the camera and radar frames), it is not unlikely to see the camera branch (i.e., the neural network used to detect objects in camera frames) being deemphasized. This is mainly due to the fact that there is no easy (e.g., affine) mapping/transformation from a camera frame to the bird's eye view. This means that the radar branch (i.e., the neural network used to detect objects in radar frames) will play the main role in the processing because it can be trained relatively easier. One way to address this issue is to use an encoder-decoder network to convert the camera frame into a frame that better resembles the radar frame. In that way, the feature map for the camera frame will be similar to the corresponding radar frame. This enables the camera network to determine an output that at least resembles the bird's eye view of the radar network in which the final result of the fusion is expected to be. Alternatively, the camera branch can be pre-trained beforehand. During the early camera-radar fusion training, the weights of this pre-trained network can be loaded (while being frozen) into the camera branch.

Note that the encoder side of an encoder-decoder network is a network that takes an input (e.g., a camera frame) and outputs a feature map/vector/tensor. The decoder side of the encoder-decoder network is a network (usually the same network structure as the encoder but in the opposite orientation) that takes the feature vector from the encoder and gives the closest match to the actual input or intended output (e.g., a camera frame that resembles a radar frame).

An advantage of using the encoder-decoder network, for taking the camera frame and making it resemble the radar frame, is that annotations are not needed for training this new camera branch. Later, the final result of this network (with pre-trained weights) can be concatenated with the radar input and/or features and run through the final layers of the network.

Figure 7:
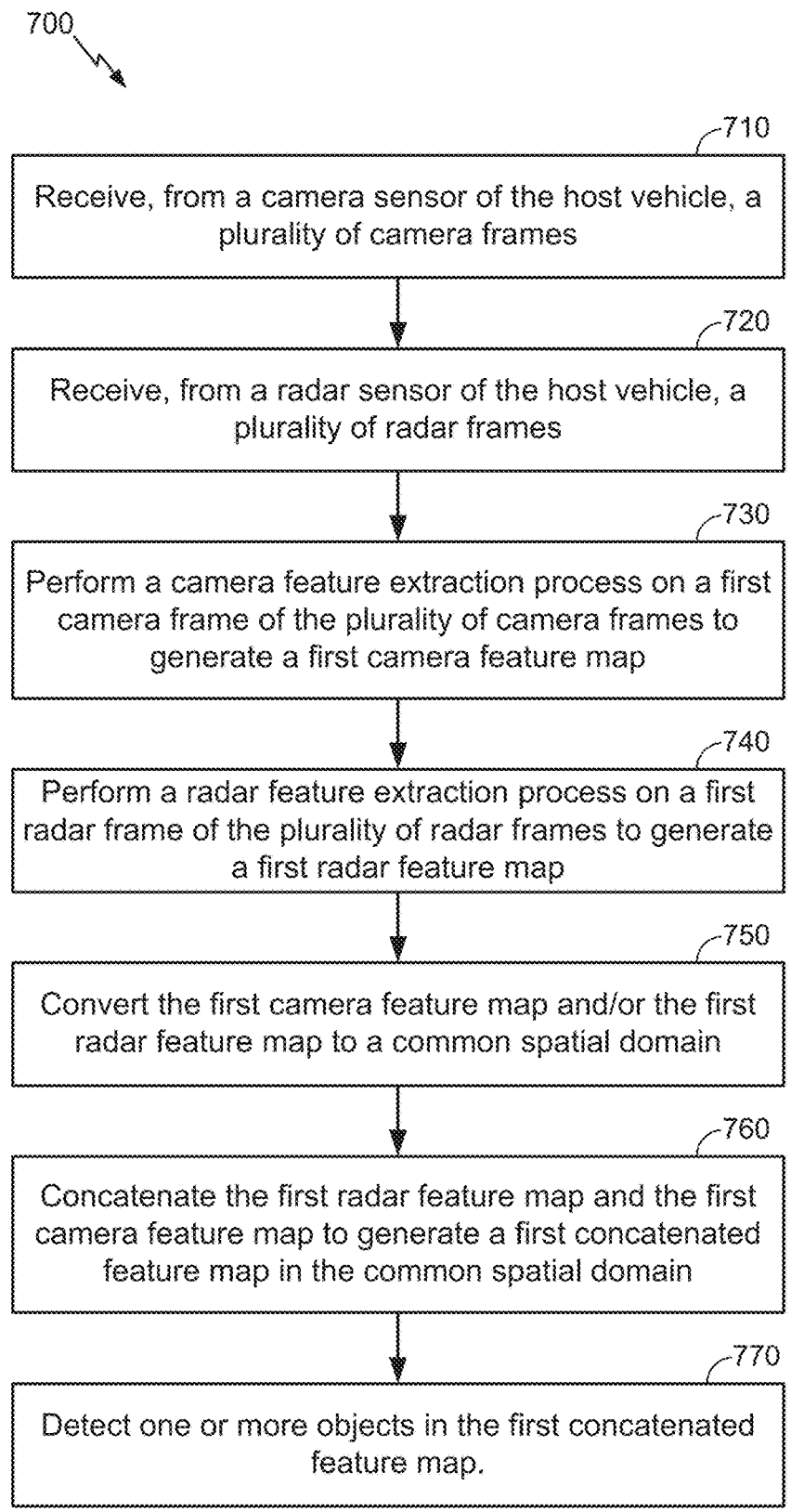
FIGS. 7 and 8 illustrate exemplary methods of fusing camera and radar frames to perform object detection in one or more spatial domains, according to aspects of the disclosure.

FIG. 7 illustrates an exemplary method 700 of fusing camera and radar frames to perform object detection in one or more spatial domains, according to aspects of the disclosure. In an aspect, the method 700 may be performed by an on-board computer (e.g., OBC 200) of a host vehicle (vehicle 100).

At 710, the OBC receives, from a camera sensor (e.g., camera 212) of the host vehicle, a plurality of camera frames. In an aspect, operation 710 may be performed by system interface(s) 210, data bus 208, memory 204, and/or processor(s) 206, any or all of which may be considered means for performing this operation.

At 720, the OBC receives, from a radar sensor (e.g., radar 214) of the host vehicle, a plurality of radar frames. In an aspect, operation 720 may be performed by system interface(s) 210, data bus 208, memory 204, and/or processor(s) 206, any or all of which may be considered means for performing this operation.

At 730, the OBC performs a camera feature extraction process on a first camera frame of the plurality of camera frames to generate a first camera feature map. In an aspect, operation 730 may be performed by processor(s) 206, which may be considered means for performing this operation.

At 740, the OBC performs a radar feature extraction process on a first radar frame of the plurality of radar frames to generate a first radar feature map. In an aspect, operation 740 may be performed by processor(s) 206, which may be considered means for performing this operation.

At 750, the OBC converts the first camera feature map and/or the first radar feature map to a common spatial domain. In an aspect, operation 750 may be performed by processor(s) 206, which may be considered means for performing this operation.

At 760, the OBC concatenates the first radar feature map and the first camera feature map to generate a first concatenated feature map in the common spatial domain. In an aspect, operation 760 may be performed by processor(s) 206, which may be considered means for performing this operation.

At 770, the OBC detects one or more objects (e.g., vehicles) in the first concatenated feature map. In an aspect, operation 770 may be performed by processor(s) 206, which may be considered means for performing this operation.

Figure 8:
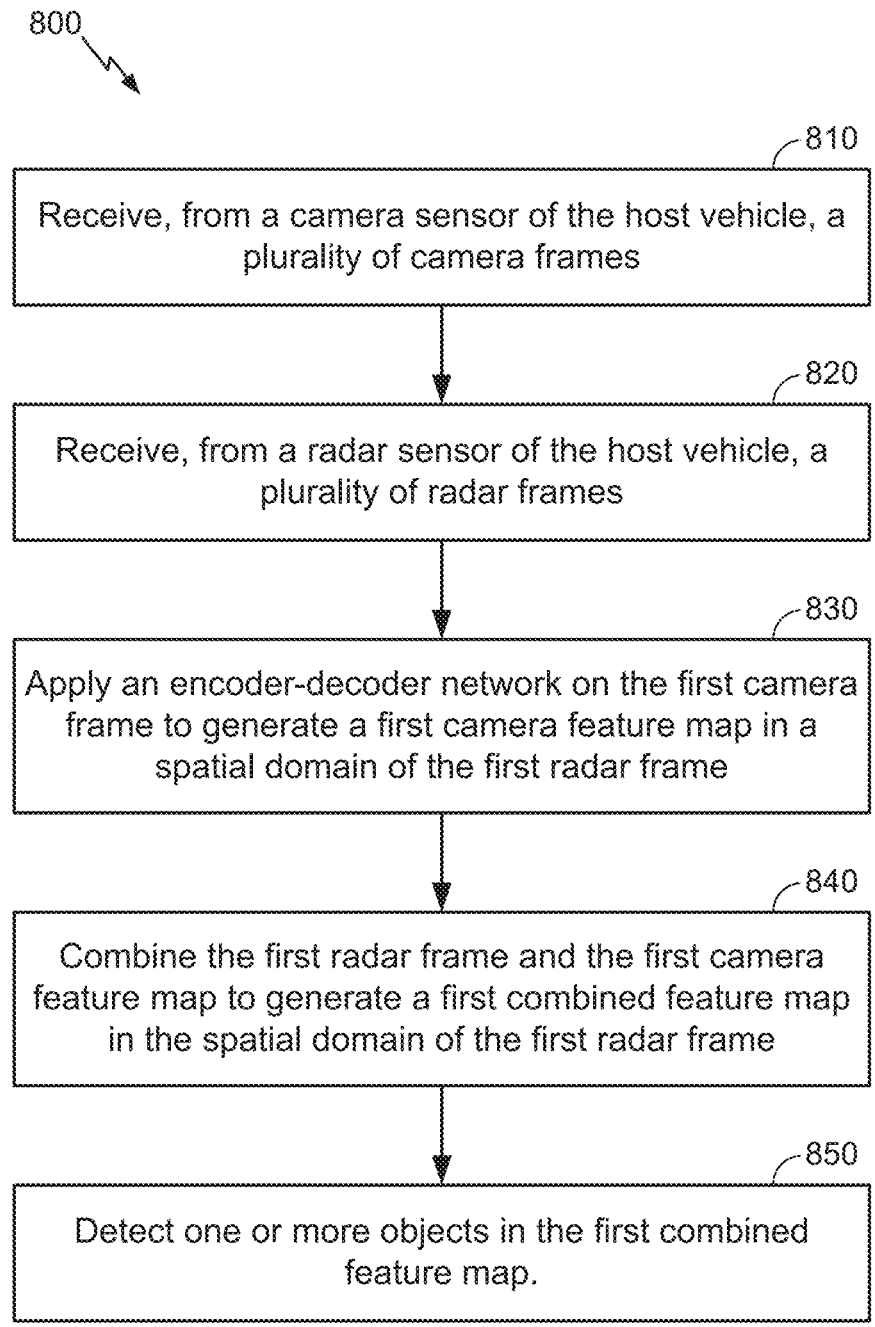

FIG. 8 illustrates an exemplary method 800 of fusing camera and radar frames to perform object detection in one or more spatial domains, according to aspects of the disclosure. In an aspect, the method 800 may be performed by an on-board computer (e.g., OBC 200) of a host vehicle (vehicle 100).

At 810, the OBC receives, from a camera sensor (e.g., camera 212) of the host vehicle, a plurality of camera frames. In an aspect, operation 810 may be performed by system interface(s) 210, data bus 208, memory 204, and/or processor(s) 206, any or all of which may be considered means for performing this operation.

At 820, the OBC receives, from a radar sensor (e.g., radar 214) of the host vehicle, a plurality of radar frames. In an aspect, operation 820 may be performed by system interface(s) 210, data bus 208, memory 204, and/or processor(s) 206, any or all of which may be considered means for performing this operation.

At 830, the OBC applies an encoder-decoder network on the first camera frame to generate a first camera feature map in a spatial domain of the first radar frame. In an aspect, operation 830 may be performed by processor(s) 206, which may be considered means for performing this operation.

At 840, the OBC combines the first radar frame and the first camera feature map to generate a first combined feature map in the spatial domain of the first radar frame. In an aspect, operation 840 may be performed by processor(s) 206, which may be considered means for performing this operation.

At 850, the OBC detects one or more objects (e.g., vehicles) in the first combined feature map. In an aspect, operation 850 may be performed by processor(s) 206, which may be considered means for performing this operation.

It should be noted that, although particular frequencies, integrated circuits (ICs), hardware, and other features are described in the aspects herein, alternative aspects may vary. That is, alternative aspects may utilize additional or alternative frequencies (e.g., other the 60 GHz and/or 28 GHz frequency bands), antenna elements (e.g., having different size/shape of antenna element arrays), scanning periods (including both static and dynamic scanning periods), electronic devices (e.g., mobile phones, tablets, personal computer (PC), etc.), and/or other features. A person of ordinary skill in the art will appreciate such variations.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for personalized face verification with radar images.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of performing early fusion of camera and radar frames to perform object detection in one or more spatial domains performed by an on-board computer of a host vehicle, comprising:
receiving, from a camera sensor of the host vehicle, a plurality of camera frames;
receiving, from a radar sensor of the host vehicle, a plurality of radar frames;
performing a camera feature extraction process on a first camera frame of the plurality of camera frames to generate a first camera feature map;
performing a radar feature extraction process on a first radar frame of the plurality of radar frames to generate a first radar feature map, wherein the first radar frame corresponds in time to the first camera frame;
converting the first camera feature map, the first radar feature map, or both to a common spatial domain;
concatenating the first radar feature map and the first camera feature map to generate a first concatenated feature map in the common spatial domain;
performing object detection on the first concatenated feature map to detect one or more objects in the first concatenated feature map without performing object detection on the first camera feature map or the first radar feature map; and
estimating a width, length, or both of the one or more objects in a bird's eye view, after inverse perspective mapping, based on a bounding box in the first camera frame encapsulating each of the one or more objects.

2. The method of claim 1, wherein the common spatial domain is a spatial domain of the radar sensor.

3. The method of claim 1, wherein:
converting the first camera feature map, the first radar feature map, or both to the common spatial domain comprises converting the first camera feature map to the common spatial domain, and
converting the first camera feature map to the common spatial domain comprises performing an explicit inverse perspective mapping transformation on the first camera feature map.

4. The method of claim 1, wherein:
converting the first camera feature map, the first radar feature map, or both to the common spatial domain comprises converting the first camera feature map to the common spatial domain, and
converting the first camera feature map to the common spatial domain occurs during performing the camera feature extraction process.

5. The method of claim 1, further comprising:
hashing a plurality of blocks of the first camera frame to identify one or more blocks that have not changed between a previous camera frame of the plurality of camera frames and the first camera frame; and
copying feature map values of a second camera feature map of the previous camera frame to corresponding feature map values of the first feature map.

6. The method of claim 1, wherein the width, length, or both of the one or more objects is estimated based at least in part on a make, model, or both of the one or more objects.

7. The method of claim 1, further comprising:
performing the camera feature extraction process on a second camera frame of the plurality of camera frames to generate a second camera feature map;
performing the radar feature extraction process on a second radar frame of the plurality of radar frames to generate a second radar feature map;
converting the second camera feature map to the common spatial domain to generate a converted camera feature map, the second radar feature map to the common spatial domain to generate a converted radar feature map, or both; and
concatenating the converted second radar feature map, the converted second camera feature map, or both to generate a second concatenated feature map,
wherein detecting the one or more objects is further based on the second concatenated feature map.

8. The method of claim 1, wherein the radar sensor and the camera sensor are collocated in a shared housing in the host vehicle.

9. The method of claim 1, further comprising:
performing an autonomous driving operation based on detecting the one or more objects.

10. The method of claim 9, wherein the autonomous driving operation is one or more of braking, accelerating, steering, adjusting a cruise control setting, or signaling.

11. A method of performing early fusion of camera and radar frames to perform object detection in one or more spatial domains performed by an on-board computer of a host vehicle, comprising:
receiving, from a camera sensor of the host vehicle, a plurality of camera frames;
receiving, from a radar sensor of the host vehicle, a plurality of radar frames;
applying an encoder-decoder network on the first camera frame to generate a first camera feature map in a spatial domain of a first radar frame, wherein the first radar frame corresponds in time to the first camera frame;
combining the first radar frame and the first camera feature map to generate a first combined feature map in the spatial domain of the first radar frame;
performing object detection on the first combined feature map to detect one or more objects in the first combined feature map without performing object detection on the first camera feature map or the first radar frame; and
estimating a width, length, or both of the one or more objects in a bird's eye view, after inverse perspective mapping, based on a bounding box in the first camera frame encapsulating each of the one or more object.

12. The method of claim 11, further comprising:
providing the first combined feature map to a neural network.

13. The method of claim 11, further comprising:
performing an autonomous driving operation based on detecting the one or more objects.

14. The method of claim 13, wherein the autonomous driving operation is one or more of braking, accelerating, steering, adjusting a cruise control setting, or signaling.

15. An on-board computer of a host vehicle, comprising:
at least one processor configured to:
receive, from a camera sensor of the host vehicle, a plurality of camera frames;
receive, from a radar sensor of the host vehicle, a plurality of radar frames;
perform a camera feature extraction process on a first camera frame of the plurality of camera frames to generate a first camera feature map;
perform a radar feature extraction process on a first radar frame of the plurality of radar frames to generate a first radar feature map, wherein the first radar frame corresponds in time to the first camera frame;

convert the first camera feature map, the first radar feature map, or both to a common spatial domain;
concatenate the first radar feature map and the first camera feature map to generate a first concatenated feature map in the common spatial domain;
perform object detection on the first concatenated feature map to detect one or more objects in the first concatenated feature map without performance of object detection on the first camera feature map or the first radar feature map; and
estimate a width, length, or both of the one or more objects in a bird's eye view, after inverse perspective mapping, based on a bounding box in the first camera frame encapsulating each of the one or more objects.

16. The on-board computer of claim 15, wherein the common spatial domain is a spatial domain of the radar sensor.

17. The on-board computer of claim 15, wherein:
the at least one processor being configured to convert the first camera feature map, the first radar feature map, or both to the common spatial domain comprises converting the first camera feature map to the common spatial domain, and
the at least one processor being configured to convert the first camera feature map to the common spatial domain comprises the at least one processor being configured to perform an explicit inverse perspective mapping transformation on the first camera feature map.

18. The on-board computer of claim 15, wherein:
the at least one processor being configured to convert the first camera feature map, the first radar feature map, or both to the common spatial domain comprises converting the first camera feature map to the common spatial domain, and
the at least one processor is configured to convert the common spatial domain to the converted first camera feature map during performance of the camera feature extraction process.

19. The on-board computer of claim 15, wherein the at least one processor is further configured to:
hash a plurality of blocks of the first camera frame to identify one or more blocks that have not changed between a previous camera frame of the plurality of camera frames and the first camera frame; and
copy feature map values of a second camera feature map of the previous camera frame to corresponding feature map values of the first feature map.

20. The on-board computer of claim 15, wherein the width, length, or both of the one or more objects is estimated based at least in part on a make, model, or both of the one or more objects.

21. The on-board computer of claim 15, wherein the at least one processor is further configured to:
perform the camera feature extraction process on a second camera frame of the plurality of camera frames to generate a second camera feature map;
perform the radar feature extraction process on a second radar frame of the plurality of radar frames to generate a second radar feature map;
convert the second camera feature map to the common spatial domain to generate a converted camera feature map, the second radar feature map to the common spatial domain to generate a converted radar feature map, or both; and
concatenate the converted second radar feature map, the converted second camera feature map, or both to generate a second concatenated feature map,
wherein detection of the one or more objects is further based on the second concatenated feature map.

22. The on-board computer of claim 15, wherein the radar sensor and the camera sensor are collocated in the host vehicle.

23. The on-board computer of claim 15, wherein the at least one processor is further configured to:
trigger an autonomous driving operation based on detecting the one or more objects.

24. The on-board computer of claim 23, wherein the autonomous driving operation is one or more of braking, accelerating, steering, adjusting a cruise control setting, or signaling.

25. An on-board computer of a host vehicle, comprising:
at least one processor configured to:
receive, from a camera sensor of the host vehicle, a plurality of camera frames;
receive, from a radar sensor of the host vehicle, a plurality of radar frames;
apply an encoder-decoder network on the first camera frame to generate a first camera feature map in a spatial domain of a first radar frame, wherein the first radar frame corresponds in time to the first camera frame;
combine the first radar frame and the first camera feature map to generate a first combined feature map in the spatial domain of the first radar frame; and
perform object detection on the first combined feature map to detect one or more objects in the first combined feature map without performance of object detection on the first camera feature map or the first radar frame; and
estimate a width, length, or both of the one or more objects in a bird's eye view, after inverse perspective mapping, based on a bounding box in the first camera frame encapsulating each of the one or more object.

26. The on-board computer of claim 25, wherein the at least one processor is further configured to:
provide the first combined feature map to a neural network.

27. The on-board computer of claim 25, wherein the at least one processor is further configured to:
trigger an autonomous driving operation based on detecting the one or more objects.

28. The on-board computer of claim 27, wherein the autonomous driving operation is one or more of braking, accelerating, steering, adjusting a cruise control setting, or signaling.

* * * * *